United States Patent [19]

Nemoto et al.

[11] Patent Number: 5,103,435
[45] Date of Patent: Apr. 7, 1992

[54] BIAS MAGNETIC FIELD MOVING APPARATUS FOR A PHOTOMAGNETIC RECORDING APPARATUS

[75] Inventors: Shigeru Nemoto, Hachioji; Sunao Aoki, Higashimurayama, both of Japan

[73] Assignee: Olympus Optical Co., Ltd., Tokyo, Japan

[21] Appl. No.: 353,436

[22] Filed: May 18, 1989

[30] Foreign Application Priority Data

May 19, 1988 [JP] Japan ................. 63-122444

[51] Int. Cl.⁵ ............... G11B 13/04; G11B 11/10; G11B 11/12
[52] U.S. Cl. ...................... 369/13; 360/114; 360/137
[58] Field of Search ............... 369/13, 59, 75.1, 75.2, 369/77.1, 77.2; 360/99.02, 99.03, 99.06, 99.07, 97.01, 118

[56] References Cited

U.S. PATENT DOCUMENTS

| 4,694,364 | 9/1987 | Matsuda et al. | 360/99.02 |
| 4,709,286 | 11/1987 | Koike | 360/99.02 |
| 4,733,385 | 3/1988 | Henmi et al. | 369/13 |
| 4,740,937 | 4/1988 | Watanabe | 369/13 |
| 4,750,063 | 6/1988 | Kume et al. | 360/99.02 |
| 4,890,175 | 12/1989 | Tezuka | 360/97.01 |
| 4,993,009 | 2/1991 | Shiho | 369/13 |

FOREIGN PATENT DOCUMENTS 62-157364 7/1987 Japan.

Primary Examiner—Stuart S. Levy
Assistant Examiner—Tan Nguyen
Attorney, Agent, or Firm—Armstrong, Nikaido, Marmelstein, Kubovcik & Murray

[57] ABSTRACT

A bias magnetic field moving apparatus for photomagnetic recording apparatus includes an arm rotatably provided in a photomagnetic recording apparatus so that one end side of the arm can approach and separate from a photomagnetic recording medium. An arm rotating mechanism rotates the arm so that one end side of the arm may approach and separate from the photomagnetic recording medium as operatively connected with the operation of loading and unloading the photomagnetic recording medium on the photomagnetic recording apparatus. A magnetic field applying member is rotatably connected to one end side of the arm, approaching and separating from the photomagnetic recording medium as operatively connected with the operation of loading and unloading the photomagnetic recording medium and applying a recording or erasing bias magnetic field to the photomagnetic recording medium. A maintaining mechanism maintains the magnetic field applying member to be parallel with the photomagnetic recording medium when the magnetic field applying member has separated the most from the photomagnetic recording medium. A fixing mechanism fixes the magnetic field applying member so as to be in a predetermined position relationship with the photomagnetic recording medium.

9 Claims, 9 Drawing Sheets

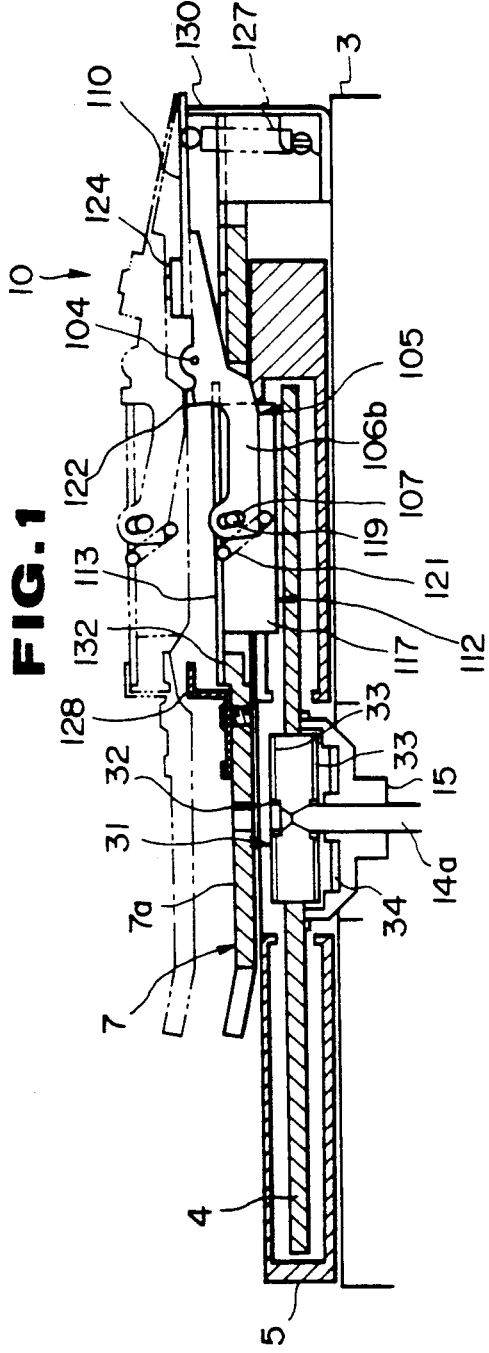
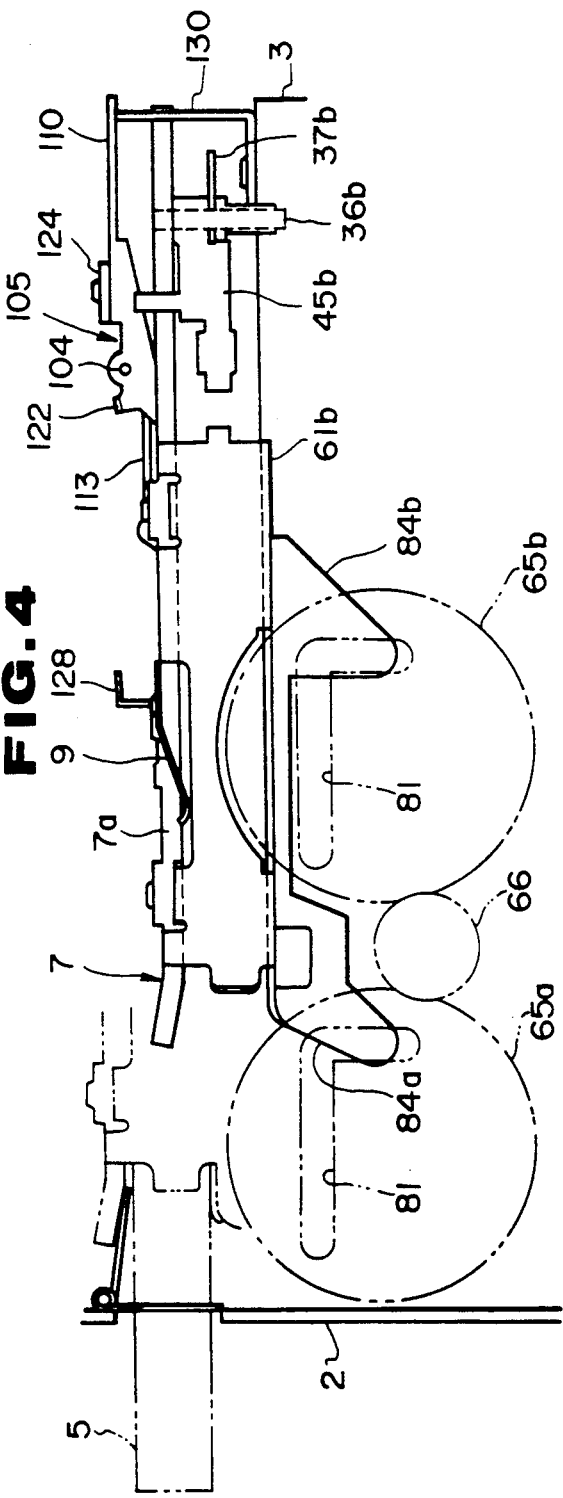

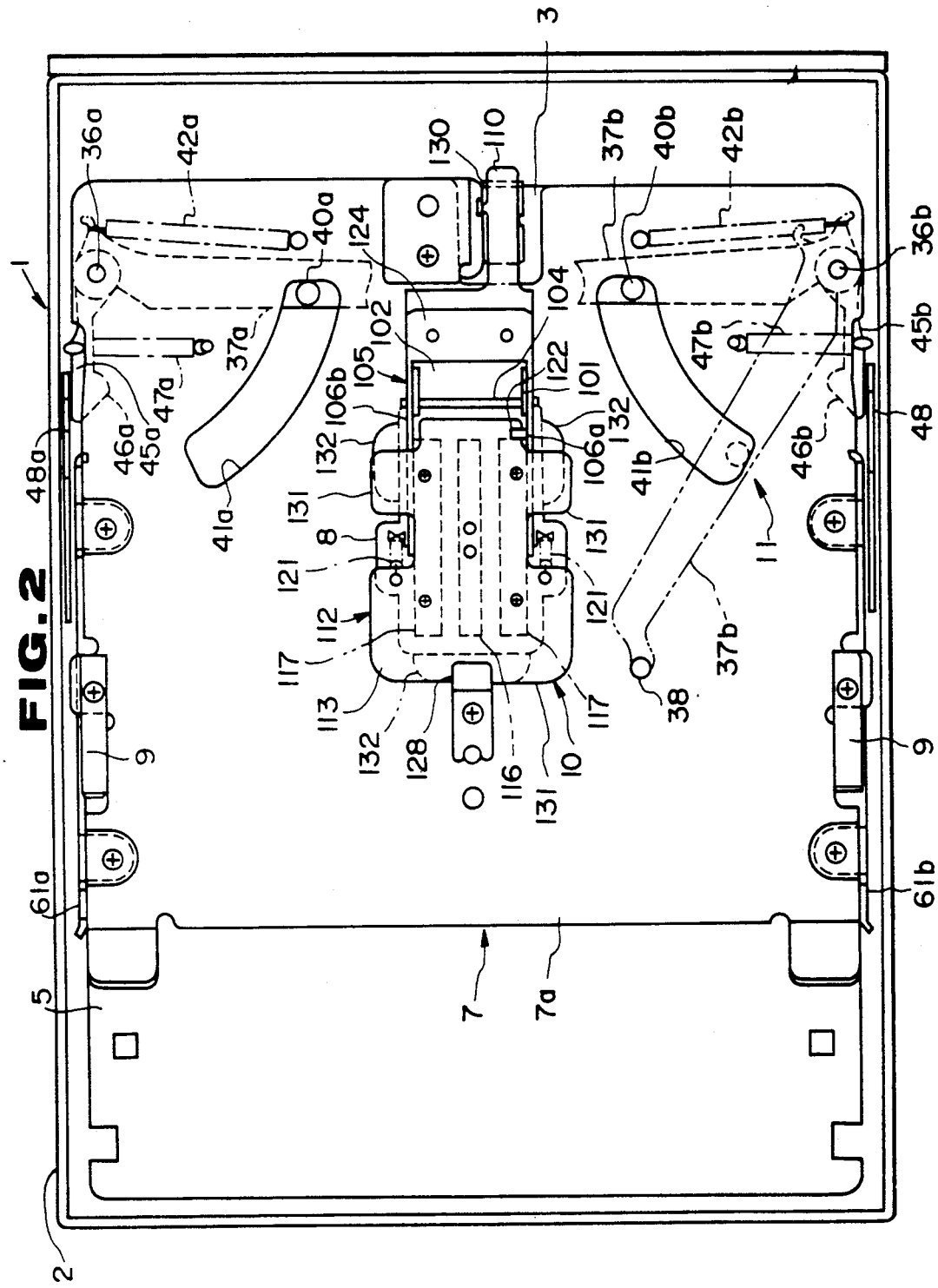

BIAS MAGNETIC FIELD MOVING APPARATUS FOR A PHOTOMAGNETIC RECORDING APPARATUS

BACKGROUND OF THE INVENTION

1. Field of the Invention

This invention relates to a bias magnetic field moving apparatus for a photomagnetic recording apparatus wherein a bias magnetic field applying member, applying a bias magnetic field to a photomagnetic recording medium, approaches or separates from the photomagnetic recording medium.

2. Related Art Statement

Recently, the development of the industry relating to information is remarkable and the amount of information to be handled tends to increase. Therefore, instead of the recording and reproducing apparatus recording and reproducing information by using the conventional magnetic head, an optical recording and reproducing apparatus using a light beam has come to be noted.

In such an optical recording and reproducing apparatus, a recording and reproducing apparatus of a photomagnetic systems (called a photomagnetic recording and reproducing apparatus hereinafter) wherein information can be erased and re-written is noted.

In such a photomagnetic recording and reproducing apparatus, a bias magnetic field must be applied to the recording medium at the time of erasing and recording information and therefore a magnetic field applying apparatus is provided. In this magnetic field applying apparatus, a magnetic field applying member using a permanent magnet or coil is arranged close to the recording medium at the time of erasing and recording information.

As shown, for example, in the publication of Japanese Patent Application Laid Open No. 157364/1987, in the above mentioned photomagnetic recording and reproducing apparatus, a disc-like recording medium (called also a disc) is contained generally within a cartridge and the above mentioned magnetic field applying member is put into an opening formed in the above mentioned cartridge to apply a magnetic field and is arranged close to the disc surface. In the case of fitting (loading) and removing (unloading) the above mentioned cartridge to and from the photomagnetic recording and reproducing apparatus, the above mentioned magnetic field applying member must be separated from the cartridge. Therefore, as shown, for example, in the publication of the above mentioned Japanese Patent Application Laid Open No. 157364/1987, a magnetic field applying member is fitted to the end of an arm rotated as operatively connected with the loading and unloading operation to form a bias magnetic field moving apparatus by which the magnetic field applying member is close to or separated from a cartridge.

However, in the conventional bias magnetic field moving apparatus, as the magnetic field applying member is fitted to the arm so as to be parallel with the cartridge and disc close to the cartridge, when separated from the cartridge, the above mentioned magnetic field applying member will be oblique to the cartridge. Therefore, there are problems that the magnetic field applying member moving range is large, that is, the magnetic field applying member upward projecting amount is large and the photomagnetic recording apparatus is large in the size.

OBJECTS AND SUMMARY OF THE INVENTION

An object of the present invention is to provide a bias magnetic field moving apparatus for a photomagnetic recording apparatus wherein the magnetic field applying member moving range can be made small and the photomagnetic recording apparatus can be made small in size.

Another object of the present invention is to provide a bias magnetic field moving apparatus for a photomagnetic recording apparatus wherein the magnetic field applying member can be accurately positioned with respect to the photomagnetic recording medium.

A further object of the present invention is to provide a bias magnetic field moving apparatus for photomagnetic recording apparatus wherein the position of the magnetic field applying member can be positively maintained with respect to the photomagnetic recording medium.

A bias magnetic field moving apparatus for photomagnetic recording apparatus includes:

an arm rotatably provided in a photomagnetic recording apparatus so that one end side of the arm can approach and separate from a photomagnetic recording medium;

an arm rotating mechanism rotating the above mentioned arm so that one end side of the above mentioned arm may approach and separate from the above mentioned photomagnetic recording medium as operatively connected with the operation of loading and unloading the above mentioned photomagnetic recording medium on the above mentioned photomagnetic recording apparatus;

a magnetic field applying member rotatably connected to the above mentioned arm on one end side, approaching to and separating from the above mentioned photomagnetic recording medium as operatively connected with the operation of loading and unloading the above mentioned photomagnetic recording medium and applying a recording or erasing bias magnetic field to the above mentioned photomagnetic recording medium;

a maintaining device maintaining the above mentioned magnetic field applying member to be substantially parallel with the above mentioned photomagnetic recording medium when the above mentioned magnetic field applying member has separated the most from the above mentioned photomagnetic recording medium; and a fixing device fixing the above mentioned magnetic field applying member so as to be in a predetermined position relationship with the above mentioned photomagnetic recording medium when the above mentioned magnetic field applying member has approached the above mentioned photomagnetic recording medium.

The other features and advantages of the present invention will become apparent enough with the following explanation.

BRIEF DESCRIPTION OF THE DRAWINGS

FIGS. 1 to 10 relate to an embodiment of the present invention.

FIG. 1 is a sectioned view showing a cartridge holder.

FIG. 2 is a plan view of an information recording and reproducing apparatus.

FIG. 3 is a bottom view of an information recording and reproducing apparatus.

FIG. 4 is a side view showing a cartridge holder.

FIG. 5 is a perspective view of an information recording and reproducing apparatus.

FIG. 6 is a side view showing an auto-loading mechanism.

FIG. 8 is a perspective view of a magnetic field applying apparatus as disassembled.

FIG. 10 is a plan view of a disc cartridge.

DETAILED DESCRIPTION OF PREFERRED EMBODIMENTS

Figure 3:
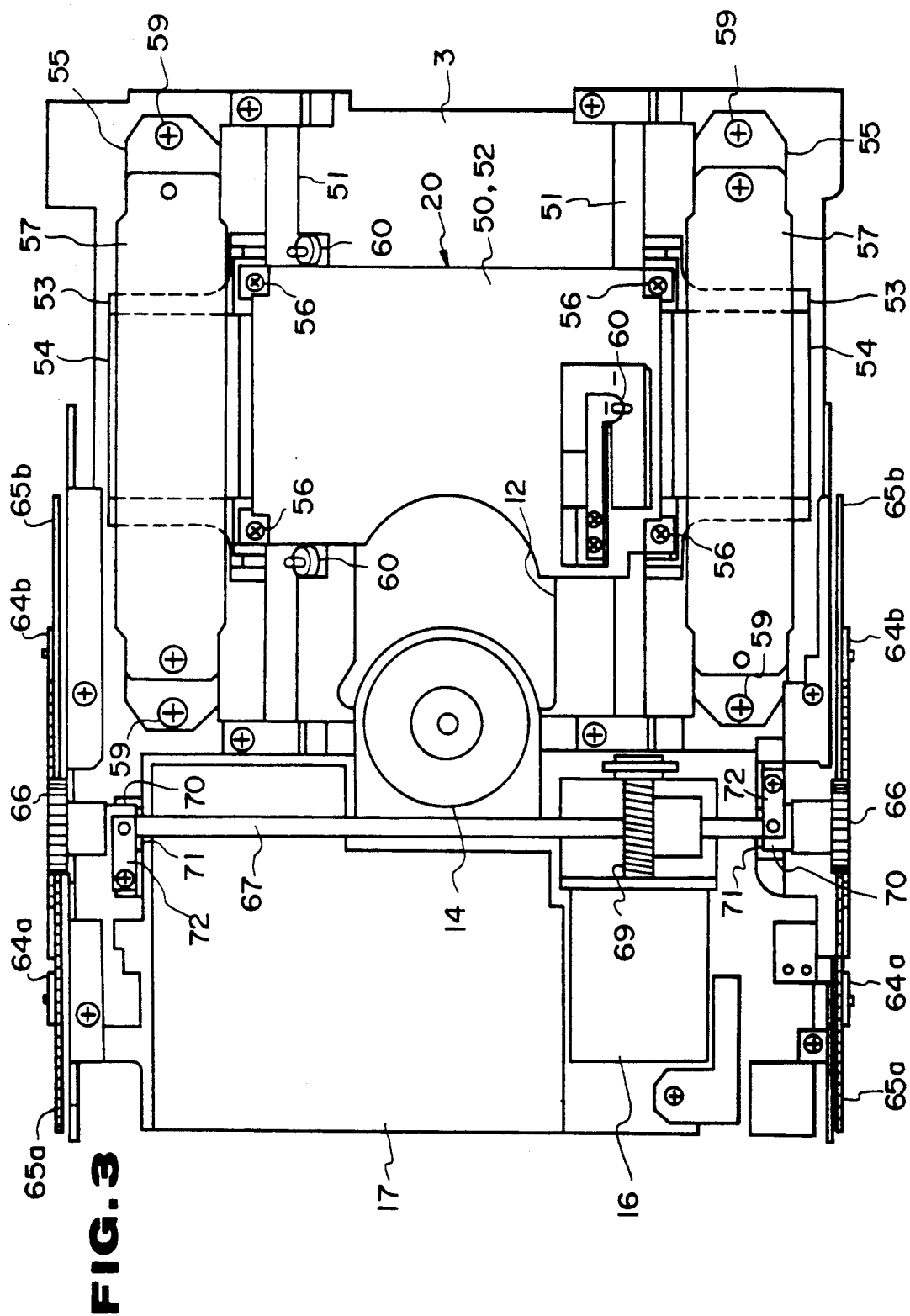

An embodiment of the present invention is shown in FIGS. 1 to 10.

As shown in FIG. 2, an information recording and reproducing apparatus 1 of a photomagnetic system to which this embodiment is applied is provided with a base 3 contained and fixed within housing body 2. On the above mentioned base 3, a cartridge holder 7 provided with an opening to be an inserting port 6 for a disc cartridge (which shall be mentioned as a cartridge hereinafter) 5 (FIG. 5) containing a disc-like recording medium (which shall be mentioned as a disc hereinafter) 4 as a photomagnetic recording medium is fitted so a to be movable in the above mentioned cartridge 5 inserting direction. The above mentioned cartridge holder 7 is to be moved by a later described auto-loading mechanism to fit (load) and remove (unload) the cartridge 5.

The above mentioned cartridge holder 7 is formed of a plate-like upper plate 7a substantially square or rectangular on the upper surface and side plates 61a and 61b are fitted to both sides of this upper plate 7a. These side plates 61a and 61b have respectively inward bent parts so that the above mentioned cartridge 5 may be inserted between these bent parts and the above mentioned upper plate. A substantially rectangular opening 8 whose inserting direction is the lengthwise direction is provided substantially in the center of the upper plate 7a of the above mentioned cartridge holder 7 and a bias magnetic field applying apparatus 10 is elevatably fitted to be present in this opening 8 from the upper side. A shutter opening and closing apparatus 11 for the above mentioned cartridge 5 is provided in the inserting direction inner part within the above mentioned cartridge holder 7. Plate springs 9 pressing the cartridge 5 on the upper surface are fitted to both sides of the above mentioned upper plate 7a.

As shown in FIG. 3, on the upper surface of the above mentioned base 3, a substantially rectangular opening 12 is formed from the center or rather inserting port 6 side to the inserting direction inner side and a spindle motor 14 is provided below the inserting part 6 side of this opening 12. As shown in FIG. 1, a turntable 15 is fitted to a driving shaft 14a of this spindle motor 14 and the above mentioned driving shaft 14a and turntable 15 somewhat project on the base 3 through the above mentioned opening 12. The disc 4 within the cartridge 5 held and loaded by the above mentioned cartridge holder 7 is fitted on the above mentioned turntable 15 and is rotated and driven by the spindle motor 14.

As shown in FIG. 3, on the above mentioned spindle motor 14 inserting direction inner side, an optical type pickup 20 is movably arranged in the lengthwise direction of the above mentioned opening 12.

Below the above mentioned base 3, a motor 16 as an auto-loading driving source and a substrate 17 forming an electronic circuit are fitted substantially below the above mentioned cartridge holder 7 inserting hole 6.

Figure 10:
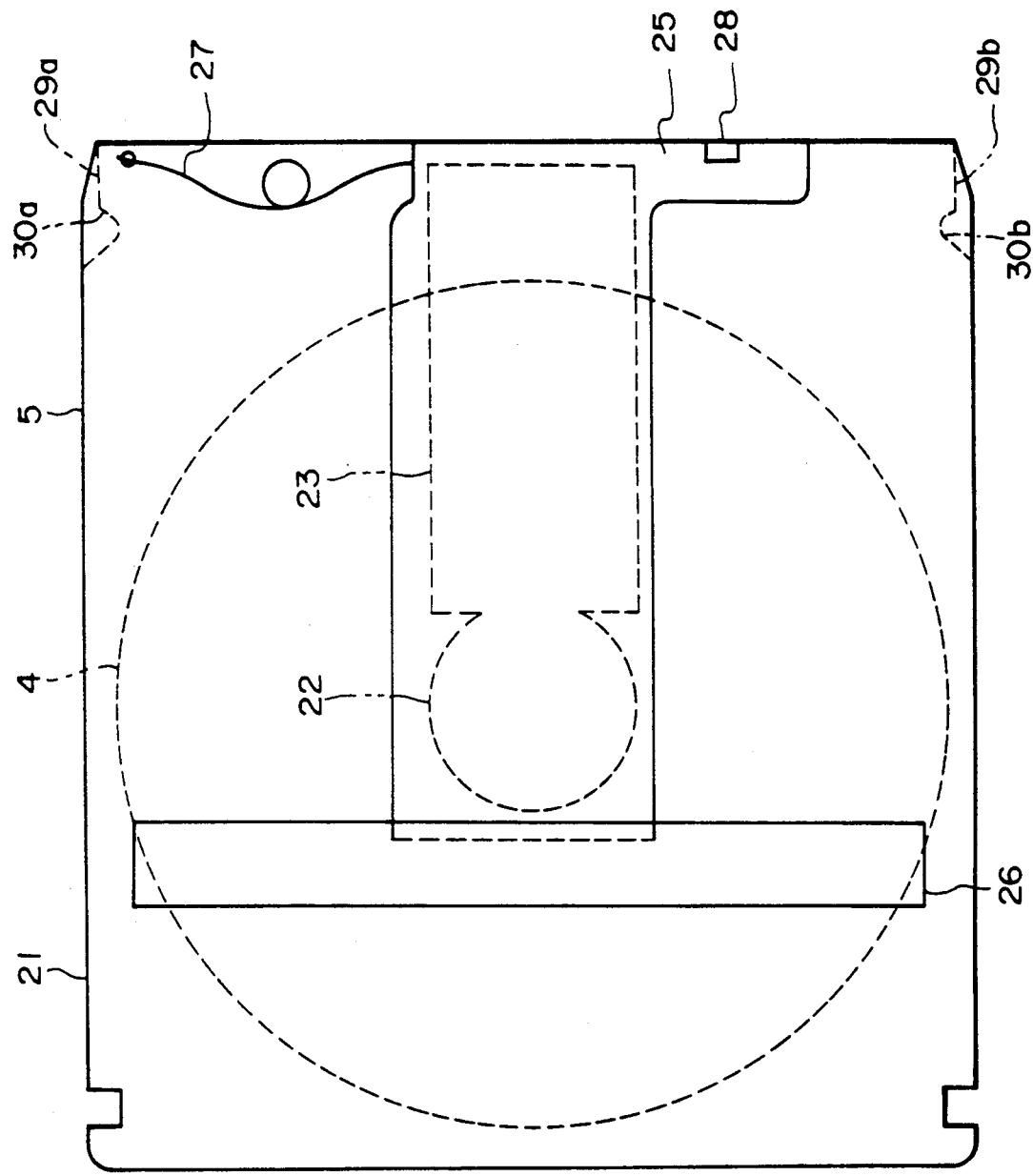

The cartridge 5 housing the above mentioned disc 4 is formed as shown, for example, in FIG. 10. That is to say, the cartridge 5 is provided with a flat, rectangular parallelepiped-like and hollow cartridge body 21, a circular opening 22 in which the turntable 15 is inserted is formed in the central part of the upper and lower surfaces of this cartridge body 21 and a recording, reproducing and erasing rectangular opening 23 is formed from this opening 22 to the inserting direction inner side. A shutter 25 folded back like channels to cover the upper and lower openings 22 and 23 is provided outside the above mentioned openings 22 and 23. The respective end parts folded back like channels of this shutter 25 are engaged inside guide plates 26 provided on the upper and lower surfaces of the cartridge body 21 so that the shutter 25 may be movable in the direction intersecting at right angles with the inserting direction along these guide plates 26. A spring 27 housed within the cartridge 5 is fixed at one end to the above mentioned shutter 25 inserting direction inner side end part and at the other end to the cartridge body 21 corner part. The above mentioned shutter 25 is energized in the direction covering the openings 22 and 23. A small opening 28 is provided on the above mentioned shutter 25 inserting direction inner side end surface.

The above mentioned cartridge body 21 inserting direction inner side end part is incised as tapered so that the width of both side ends may be somewhat smaller so as to be easy to insert into the inserting port 6. Grooves 29a and 29b are formed in the thickness direction central part near the tapered incised part. Arcuate recesses 30a and 30b are formed in predetermined positions of these grooves 29a and 29b.

Also, as shown in FIG. 1, a disc-like center member 31 thicker than the disc 4 is fitted in the central part of the above mentioned disc 4. This center member 31 is held by the turntable 15 and a hole 32 in which the driving shaft 14a of the spindle motor 14 is inserted is formed in the central part of the upper and lower surface of the center member 31. The above mentioned center member 31 is coated on the upper and lower surfaces with respective magnetic materials 33. On the other hand, a permanent magnet 34 is fixed to the above mentioned turntable 15 in the position opposed to the above mentioned magnetic material 33. The disc 4 is clamped by the attraction of this magnet 34 and the above mentioned magnetic material 33.

The shutter opening and closing apparatus 11 opening and closing the shutter 25 of the above mentioned cartridge 5 is formed as in the following. As shown in FIG. 2, two arms 37a and 37b rotatable respectively with pins 36a and 37b as centers are provided in both corners of the inner side within the cartridge holder 7. A pin 38 engaging with the opening 28 of the above mentioned shutter 25 is provided at one end of each of these arms 37a and 37b. In FIG. 2, only the pin 38 on one arm 37b side is shown. The above mentioned arms 37a and 37b are arranged as displaced in the vertical direction so as not to butt against each other and the pin 38 is also fitted vertically to the respective arms 37a and 37b. Pins 40a and 40b are provided to project respectively on the upper surfaces of substantially central parts of the above mentioned arms 37a and 37b. On the other hand, arcuate guide holes 41a and 41b with which the above mentioned pins 40a and 40b are respectively engaged are formed in the upper plate 7a. The rotating ranges of the above mentioned arms 37a and 37b are regulated by these guide holes 41a and 41b Springs 42a and 42b are fixed respectively at one end to the above mentioned arms 37a and 37b at the other ends and are fixed at the other ends to the cartridge holder 7. The above mentioned arms 37a and 37b are energized by these springs 42a and 42b so that the pin 38 handle may rotate at the end to the inserting port 6 side.

In the thus formed shutter opening and closing apparatus 11, when the cartridge 5 is inserted into the cartridge holder 7, first of all, one of the above mentioned pins 38 will engage with the opening 28 of the shutter 25. When the cartridge 5 is further inserted, the arms 37a and 37b will be pushed by the cartridge 5 to rotate to the inner side. With this, the pin 38 engaged with the above mentioned opening 28 will move the shutter 25 in the opening direction. In case the cartridge 5 as inverted is inserted into the cartridge holder 7 against the above described case, the other pin 8 will engage with the opening 28 and the shutter 25 will be opened the same as in the above described case.

Also, in this embodiment, a cartridge locking mechanism formed as in the following is provided. Locking levers 45a and 45b rotatable with the above mentioned pins 36a and 36b as centers are provided and projections 46a and 46b engaged with recesses 30a and 30b of the above mentioned cartridge 5 are formed at the ends of these locking levers 45a and 45b. These projections 46a and 46b are formed on the inserting port 6 side to be tapered so as to be easy to engage with the above mentioned recesses 30a and 30b. Springs 47a and 47b are fixed respectively at one end to the above mentioned locking levers substantially in the central parts and are fixed at the other ends to the cartridge holder 7. The above mentioned locking levers 45a and 45b are energized by these springs 47a and 47b to rotate in the direction in which the above mentioned projections 46a and 46b engage with the recesses 30a and 30b. Also, locking plates 48a and 48b are fitted to both sides of the base 3. In case the cartridge holder 7 is more on the loading side than in a predetermined position, these locking plates 48a and 48b will contact the above mentioned locking levers 45a and 45b on the sides to regulate the rotation of these locking levers 45a and 45b.

In the thus formed cartridge locking mechanism, when the cartridge 5 is inserted into the cartridge holder 7, the projections 46a and 46b of the locking lever 45a and 45b will engage with the recesses 30a and 30b of the cartridge 5. As the above mentioned locking levers 45a and 45b are energized in the direction of engaging with the recesses 30a and 30b, the cartridge 5 will be held against the cartridge holder 7 with a predetermined force. When the cartridge holder 7 is moved to the loading side by loading the cartridge 5, the locking plates 48a and 48b will contact the side parts of the locking levers 45a and 45b to regulate the rotation of these locking levers 45a and 45b and therefore the cartridge 5 will be positively fixed to the cartridge holder 7. On the contrary, in the case of unloading the cartridge, first the regulation of the rotation of the locking levers 45a and 45b will be released but, as these locking levers 45a and 45b are energized in the direction of engaging with the recesses 30a and 30b, the cartridge 5 will continue to be held against the cartridge holder 7 with the predetermined force. Therefore, in the case of unloading the cartridge 5, the cartridge 5 will not spring out.

The above mentioned optical pickup 20 is formed as shown in FIG. 3. That is to say, the optical pickup 20 is provided with a pickup body 52 provided in a carriage 50 having holes through which two rails 51 are inserted. The rails 51 inserted through the above mentioned carriage 50 are laid in the disc 4 inserting direction. The above mentioned carriage 50 is fitted with, for example, three guide rollers 60 rolling in contact with the above mentioned rails 51 and the above mentioned pickup body 52 is movable in the radial direction of the disc 4 along the above mentioned rails 51. Bobbins 53 are removably fitted, for example, with four screws 56 on both sides of the above mentioned pickup body 52. A coil 54 is wound on the outer periphery of this bobbin 53 and an inner yoke 55 is inserted through the bobbin 53. Outer yokes 57 are arranged respectively above and below the above mentioned bobbin 53. Magnets (not illustrated) are fixed respectively to the end surfaces on the sides opposed to the bobbin 53 of the respective outer yokes 57. This magnet is opposed to the above mentioned coil 54 with a predetermined spacing. The above mentioned inner yoke 55 and upper and lower outer yokes 57 are made integral by a yoke stay not illustrated) and the three yokes made integral are fixed to the base 3 with screws 59. When an electric current is flowed through the above mentioned coil 54, the pickup body 52 will be able to be moved by a torque produced by the magnetic field by the above mentioned magnet and the current of the above mentioned coil, The above mentioned pickup body 52 has an actuator (not illustrated) fitted on the upper surface of the carriage 50. By this actuator, an objective lens is held movably in the radial direction of the disc 4 and the optical axial direction. The above mentioned objective lens is opposed to the disc 4 through the opening 12 of the base 3 and the opening 23 of the cartridge 5. The above mentioned pickup body 52 is provided with a laser diode not illustrated so that the light emitted from this laser diode may be emitted to the disc 4 from the above mentioned objective lens through an optical system provided within the pickup body 52.

The auto-loading mechanism loading the above mentioned disc is formed as follows.

Figure 5:
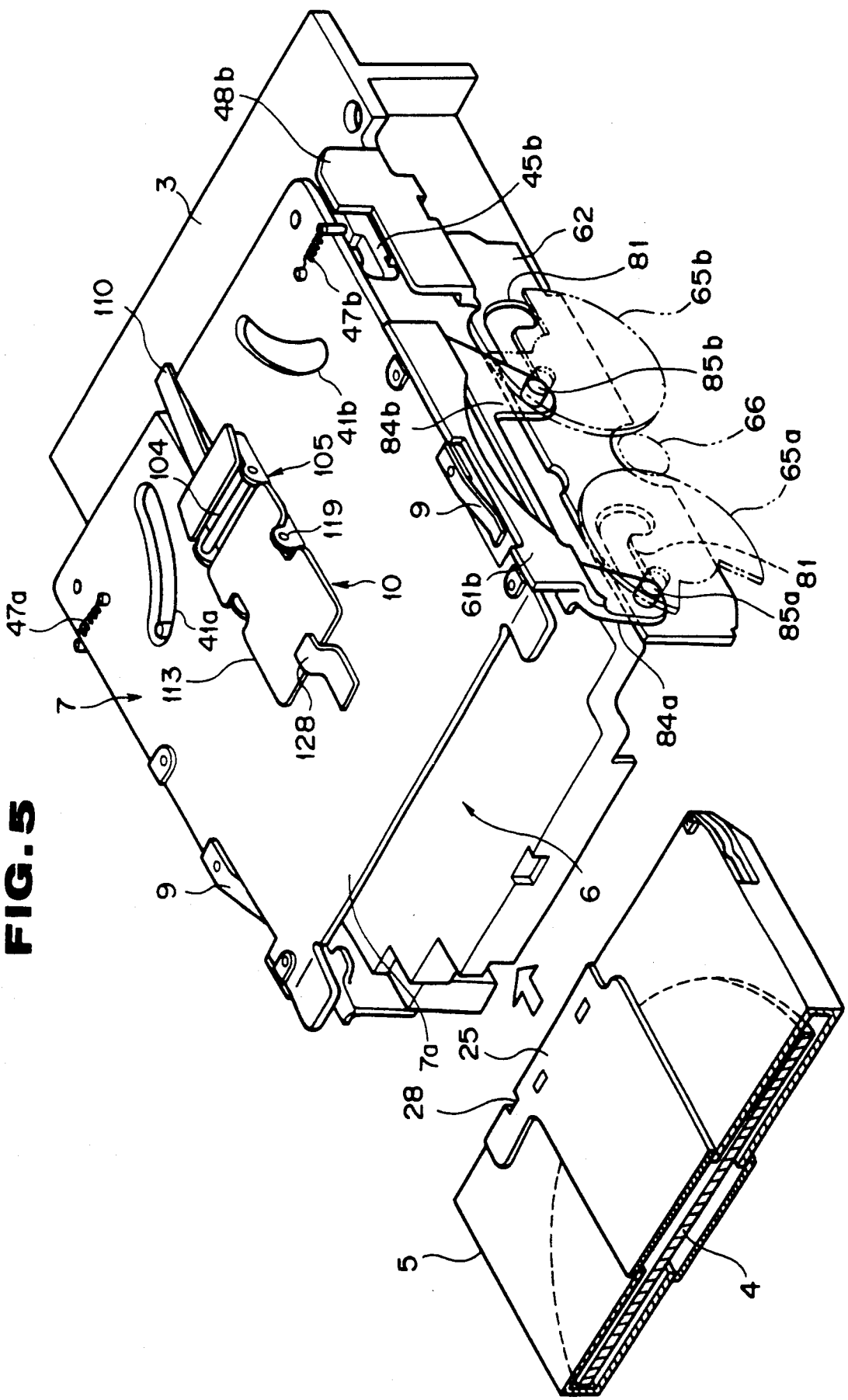
Figure 6:
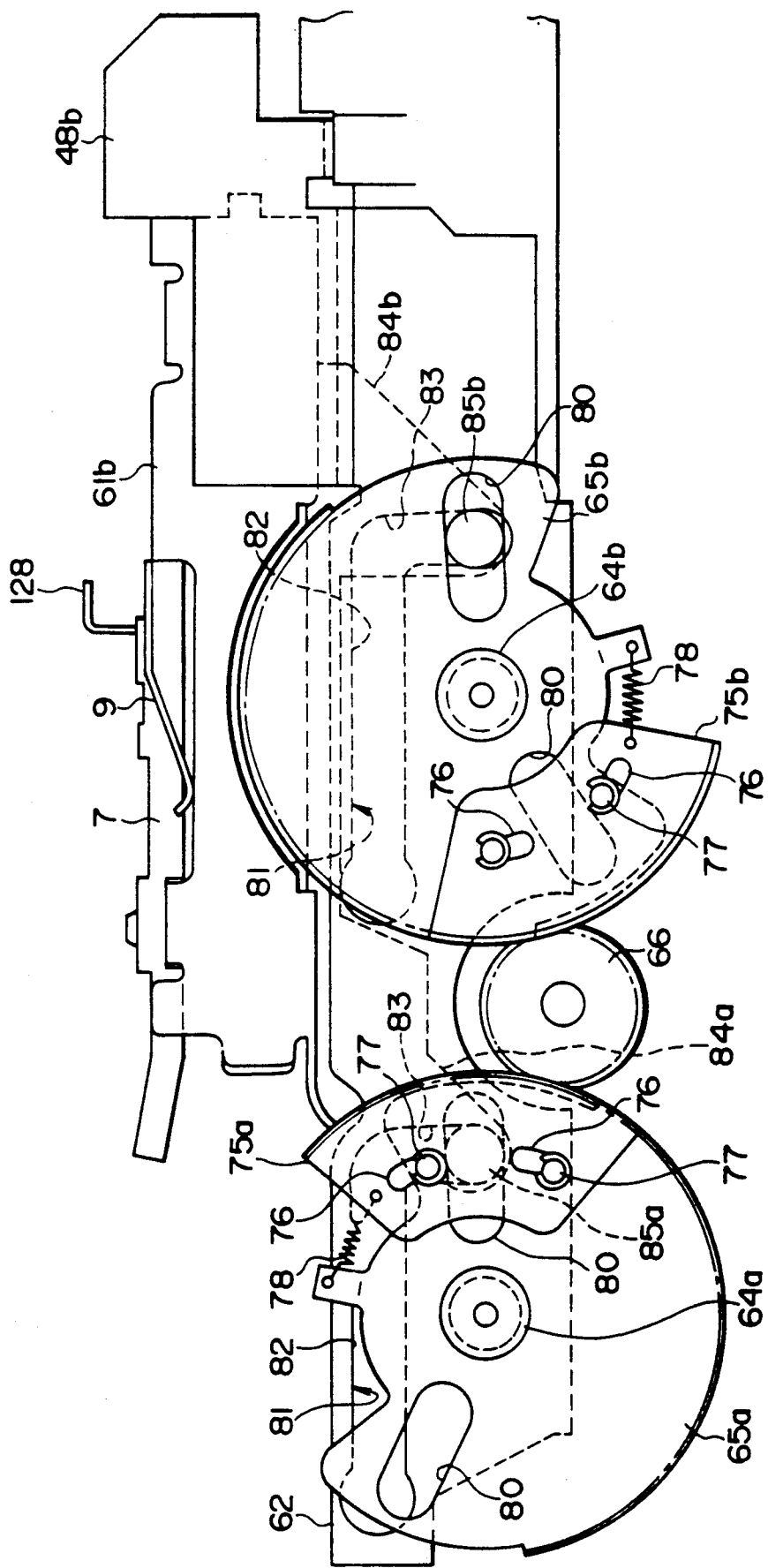
Figure 7A:
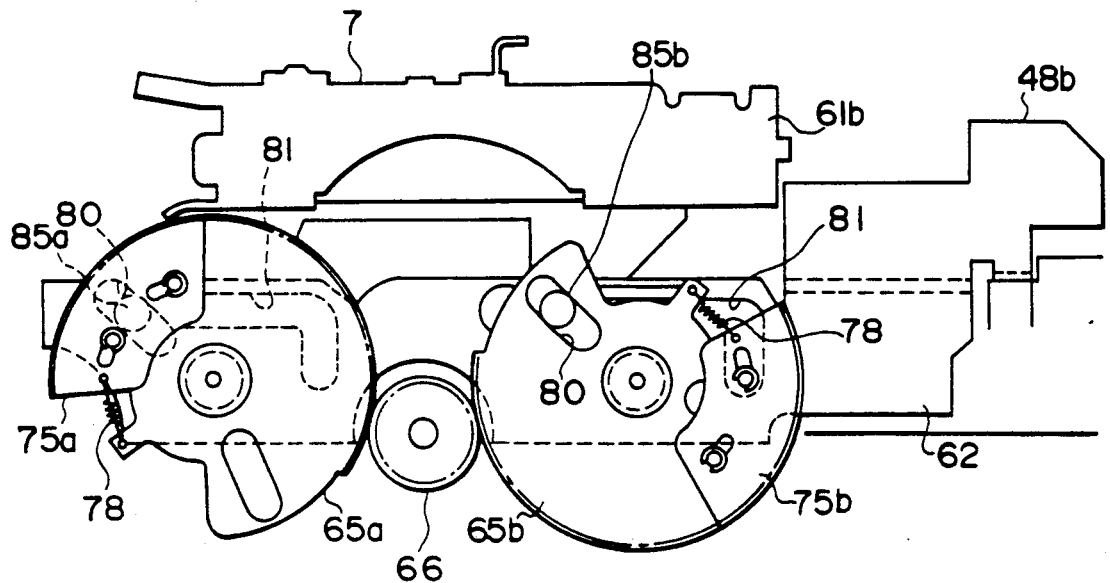
FIGS. 7(a) and (b) are side views for explaining the operation of an auto-loading mechanism.
Figure 7B:
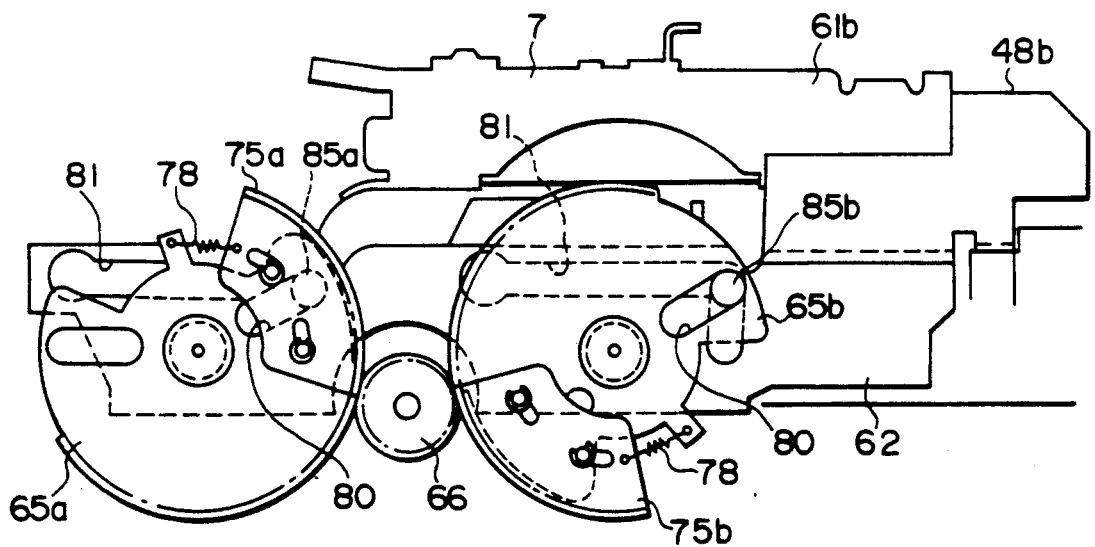

As shown in FIG. 5, guide plates 62 are fitted on both sides of the above mentioned base 3. These guide plates 62 are formed integrally with the locking plates 48a and 48b. On each side of the above mentioned base 3, two gear shafts 64a and 64b (FIG. 6) are fitted in the inserting direction. These gear shafts 64a and 64b project outward through each guide plate 62. Main gears 65a and 65b of a large diameter are rotatably fitted to the above mentioned respective gear shafts 64a and 64b. A driving gear 66 of a small diameter is arranged below the middle of the above mentioned main gears 65a and 65b and is meshed with both main gears 65a and 65b. As shown in FIG. 3, the driving gears 66 on both sides are connected with each other through a gear shaft 67 fitted with a worm wheel 69 meshed with a worm (not illustrated) fitted to the driving shaft of the loading motor 16. Bearings 70 are provided at both ends of the above mentioned gear shaft 67, are inserted into bearing parts 71 provided in the base 3 and are pressed and fixed by plate-like bearing retainers 72 fitted to the above mentioned bearing parts 71 with screws. When the above mentioned motor 16 is thus rotated and driven, the main gears 65a and 65b will be rotated through the driving gears 66.

The above mentioned main gears 65a and 65b are formed to be incised in a sector-like range of about 90 degrees of a circle and are fitted so that auxiliary gears 75a and 75b like sectors of about 90 degrees may concentrically overlap by about ¾ on the main gears 65a and 65b. Two slots 76 are formed in the peripheral direction in these auxiliary gears 75 (representing 75a and 75b) and pins 77 fixed to the main gears 65 (representing 65a and 65b) are engaged with the respective slots 76. When the above mentioned pins 77 move along the slots 76, the auxiliary gears 75 will be able to move in the peripheral direction with respect to the above mentioned main gears 65 within the predetermined range regulated by these slots 76. The above mentioned main gear 65 and auxiliary gear 75 are provided with a spring 78 by which the above mentioned auxiliary gear 75 is energized in the direction reducing the overlapping part with the main gear 65. A gear groove is provided substantially over the entire range on the outer periphery of the above mentioned auxiliary gear 75 but, on the outer periphery of the main gear 65, a part in which no gear groove is provided is formed on each peripheral end side. When the part in which the main gear 65 and auxiliary gear 75 most overlap on each other is small, a part of the gear groove of the above mentioned main gear 65 and a part of the gear groove of the auxiliary gear 75 will overlap on each other. The above mentioned driving gear 66 is formed to be of a width in which it can mesh with both of the main gear 65 and auxiliary gear 75.

Slots 80 having the radial direction as the lengthwise direction are formed near both ends in the peripheral direction of the above mentioned main gear 65.

In the above mentioned guide plate 62, two guide holes 81 are formed in the front and rear in the horizontal direction. Each guide hole 81 is formed of a horizontal hole part 82 extending linearly in the horizontal direction and a vertical hole part 83 extending vertically downward from the inner end in the inserting direction of this horizontal hole part. In the side plate 61 (representing 61a and 61b), two legs 84a and 84b are extended downward in the front and rear in the horizontal direction. In these legs 84a and 84b, pins 85a and 85b are provided to project outward and are engaged respectively with the guide holes 81 of the guide plate 62 and the slots 80 of the main gears 65.

The operation of the thus formed auto-loading mechanism is as in the following.

When the cartridge 5 is inserted into the cartridge holder 7 and the auto-loading motor 16 is rotated to rotate the driving gear 66, the main gears 65a and 65b will rotate. Then, the pins 85a and 85b provided in the legs 84a and 84b of the side plate 61 will be mentioned main gears 65a and 65b to move along the guide holes 81 of the guide plate 62. As the above mentioned pins 85a and 85b first move along the horizontal hole parts 82 of the guide holes 81, the above mentioned cartridge holder 7 will move in the horizontal direction from the state in FIG. 7(a) to the state in FIG. 7(b). When the above mentioned main gears 65a and 65b rotate further from the state in FIG. 7(b), as the above mentioned pins 85a and 85b move along the vertical hole parts 83 of the guide holes 81, the above mentioned cartridge holder 7 will fall in the vertical direction from the state in FIG. 7(b) to the state in FIG. 6. When the cartridge holder 7 thus falls, the disc 4 housed within the cartridge 5 held by this cartridge holder 7 will be mounted and fixed o the turntable 15.

In this embodiment, the driving gear 66 meshing with only the main gears 65a and 65b since just before the above mentioned cartridge holder 7 comes to the end of the loading, that is, to the position in which it falls the most will come to mesh with only the auxiliary gears 75a and 75b through meshing with both of the main gears 65a and 65b and auxiliary gears 75a and 75b. Just before the above mentioned cartridge holder 7 reaches the end of the loading, the main gears 65a and 65b will be driven through the above mentioned resiliently connected gears 75a and 75b and the cartridge holder 7 will be moved. Further, after the end of the loading is reached, only the auxiliary gears 75a and 75b will be somewhat rotated by the driving gear 66 against the energizing force of the springs 78. For example, one main gear is fitted with a magnet not illustrated so that the starting point and ending point of the loading may be detected by such magnetic sensors as two hall elements not illustrated arranged in two positions opposed to the above mentioned magnet at the starting point and ending point of the loading. When it is sensed by this sensor that the ending point position has been reached, the loading motor 16 will be stopped.

In this embodiment, for example, three reference planes (not illustrated) are provided on the upper surface of the base 3 and contact parts not illustrated bent inward and contacting the above mentioned reference plane are formed on the side plates 61a and 61b of the cartridge holder 7. When the contact parts contact the above mentioned reference plane at the time when the loading ends, the cartridge holder 7 will be positioned with respect to the base 3.

At the time of unloading the cartridge, the motor 16 will be reversely rotated and an operation reverse to the above described loading operation will be made.

Thus, in the auto-loading mechanism in this embodiment, after the ending point of the loading is reached, only the auxiliary gears 75a and 75b will be rotated by the driving gear 66 against the energizing force of the springs 78. Therefore, the gears will be prevented from biting in in case a torque is applied after the gears stop and no excess load will be applied to the motor in the case of unloading. As the cartridge holder 7 is pressed against the base 3 by the energizing force of the above mentioned springs 78, the cartridge 5 will be stably fitted.

The bias magnetic field applying apparatus 10 provided with the moving apparatus of this embodiment is formed as in the following.

Figure 8:
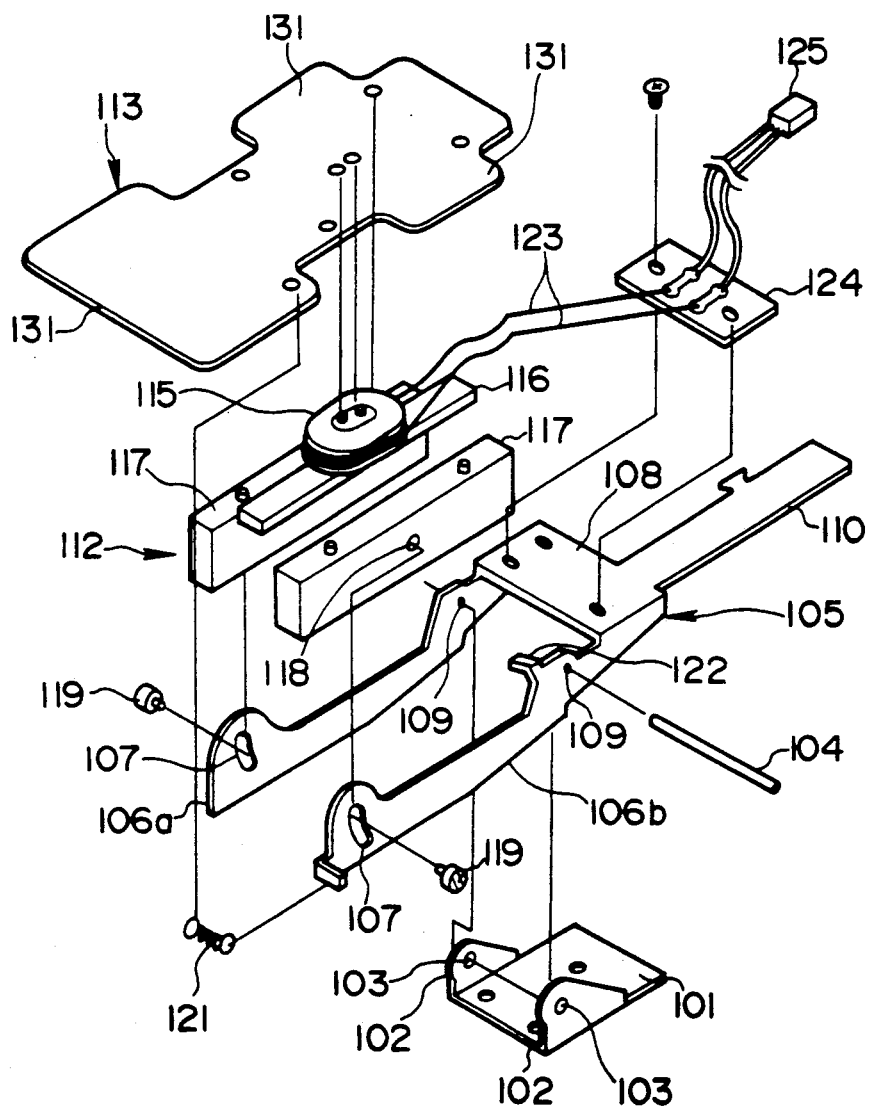

As shown in FIG. 2, in the upper plate 7a of the cartridge holder 7, a supporting base 101 is fitted, for example, with screws in the inserting direction inner side position of the opening 8. As shown in FIG. 8, this supporting base 101 is formed of a plate-like member and has bearing parts 102 formed by raising the member on both sides on the opening 8 side. Holes 103 are formed respectively in the above mentioned bearing parts 102. A shaft 104 is rotatably provided through these holes 103 and is fitted with an arm 105 which is rotatable with the above mentioned shaft 104 as a center. This arm 105 has two elongate plate-like main arm parts 106a and 106b arranged on one end side (disc 4 center side) within the above mentioned opening 8 and provided in one end part respectively with slots 107 extending substantially in the vertical direction. These main arm parts 106a and 106b are connected between the other end parts through a plate-like substrate fitting part 108. Holes 109 through which the above mentioned shaft 104 is inserted are formed in the positions between both ends of the above mentioned main arm parts 106 (representing 106a and 106b) and nearer to the other ends. An elongate plate-like lever part 110 is extended from the above mentioned substrate fitting part 108 to the inserting direction inner side The above mentioned main arm parts 106a and 106b rotate with the above mentioned shaft 104 as a center and on one end side approach or separate from the disc 4 through the above mentioned opening 8. When the above mentioned main arm parts 106a and 106b contact on the bottom sides on the other end sides with the upper plate 7a on the upper surface, the rotating range of one of the above mentioned main arm parts 106a and 106b will be regulated.

A magnetic field applying member 112 is rotatably fitted between the above mentioned main arm parts 106a and 106b and has a fitting plate 113. A plate-like Yoke 116 holding a coil 115 is fitted substantially in the central part of the bottom surface of this fitting plate 113. Rectangular parallelepipedal Yokes 117 are arranged on both sides of the above mentioned coil 115 and yoke 116 and are fitted, for example, with screws to the bottom surface of the above mentioned fitting plate 113. Screw holes 118 are provided substantially in the central parts of the respective outside surfaces of the above mentioned yokes 117 and screws 119 are screwed in these screw holes 118. The respective screws 119 are engaged with the respective slots 107 of the above mentioned respective main arm parts 106a and 106b. Therefore, this magnetic field applying member 112 is rotatable with the above mentioned screws 119 as centers and is movable in the lengthwise direction of the above mentioned slot 107.

Figure 9A:
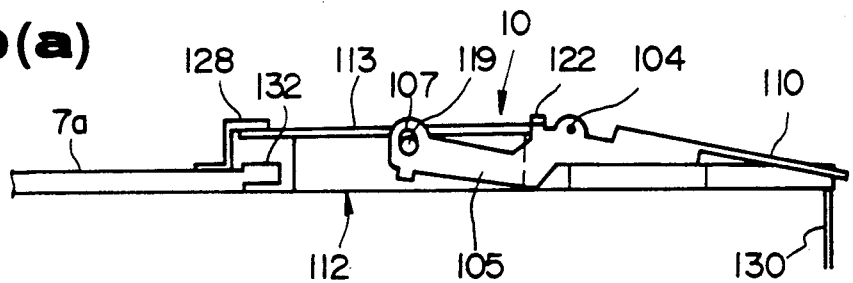
FIGS. 9(a) to (d) are side views for explaining the operation of a magnetic field applying apparatus.

A spring 121 is provided between the slot 107 side end of one main arm part 106b and the above mentioned fitting plate 113. By this spring 121, the above mentioned magnetic field applying member 112 is energized in the direction in which the end on the center side of the disc 4 is closer to the disc 4. A stopper part 122 formed by being bent inward is provided in the position on the slot 107 side somewhat more than the hole 109. As shown in FIG. 9(a), this stopper part 122 contacts the upper surface of the end part on the outer peripheral side of the disc 4 of the above mentioned fitting plate 113 to regulate the rotating range in the energizing direction by the above mentioned spring 121 of the magnetic field applying member 112.

Lead wires 123 connected to the above mentioned coil 115 are connected to a connector 125 through a substrate 124 fitted, for example, with screws on a substrate fitting part 108 of the above mentioned arm 105.

As shown in FIG. 1, a spring 127 is provided between the end of the lever part 110 of the above mentioned arm 105 and the upper surface of the base 3 and, by this spring, the arm 105 is energized in the direction in which one end part side, to which the above mentioned magnetic field applying member 112 is fitted, rotates to separate from the disc 4. A stopper part 128 contacting the upper surface of the fitting plate 113 of the above mentioned magnetic field applying member 112 is fitted to the upper plate 7a of the above mentioned cartridge holder 7. The range of the rotation in the energizing direction by the above mentioned spring 127 of the above mentioned arm 105 and magnetic field applying member 112 is regulated by the contact of this stopper part 128 with the upper surface of the above mentioned fitting plate 113.

As shown in FIGS. 1 and 9(a), by both stopper parts 122 and 128, the above mentioned magnetic field applying member 112 will be kept substantially parallel with the disc 4 when separated the most from the disc 4.

As shown in FIG. 1, on the upper surface of the end part on the inserting direction inner side of the base 3, a driving plate 130 rotating the above mentioned lever part 110 with the loading operation, is provided to project upward so as to contact the lower surface of the end part of the above mentioned lever part 110 while the cartridge holder 7, which is being loaded, falls and to push up the lever part 110 as the cartridge holder 7 falls. When the above mentioned lever part 110 is pushed up, the arm 105 will rotate with the shaft 104 as a center and the magnetic field applying member 112 will be moved close to the disc 4. When the loading ends, the above mentioned magnetic field applying member 112 will come closest to the disc 4 and will be opposed to the disc 4 at a predetermined spacing.

As shown in FIG. 2, for example, three flange parts 131 are formed on the fitting plate 13 of the above mentioned magnetic field applying member 112. A reference plane 132 projecting somewhat upward and contacting the above mentioned respective flange parts 131 when the loading ends is formed on the upper surface of the upper plate 7a of the cartridge holder 7. By the contact of the reference plane 132 with the respective flange parts 131, the magnetic field applying member 112 will be positioned in a predetermined position with respect to the disc 4.

The operation of the above mentioned bias magnetic field applying apparatus 10 shall be explained in the following with reference to FIG. 9.

First of all, before the cartridge 5 is inserted into the cartridge holder 7, as shown in FIG. 9(a), the lever part 110 of the arm 105 will be separated from the driving plate 130 and, as this arm 105 is energized by the spring 127, the magnetic field applying member 112 will rise up to a maximum. In this state, the above mentioned magnetic field applying member 112 will be maintained by the stopper parts 122 and 128 to be substantially parallel with the upper plate 7a, base 3 upper surface and fitted disc 4. Also, in this state, the position of the bottom surface of the above mentioned magnetic field applying member 112 will be substantially on the same level as of or somewhat above the lower surface of the upper plate 7a of the cartridge holder 7 so that, when the cartridge 5 is inserted into the cartridge holder 7, the magnetic field applying member 12 may not be in the way. When the magnetic field applying member 112 is thus parallelly arranged, the upward projection of this magnetic field applying member 112 will be least.

When the cartridge 5 is inserted into the cartridge holder 7 and the loading is started, the cartridge holder 7 will first move in the horizontal direction. During this horizontal movement, the magnetic field applying apparatus 10 will remain as shown in FIG. 9(a).

Figure 9B:
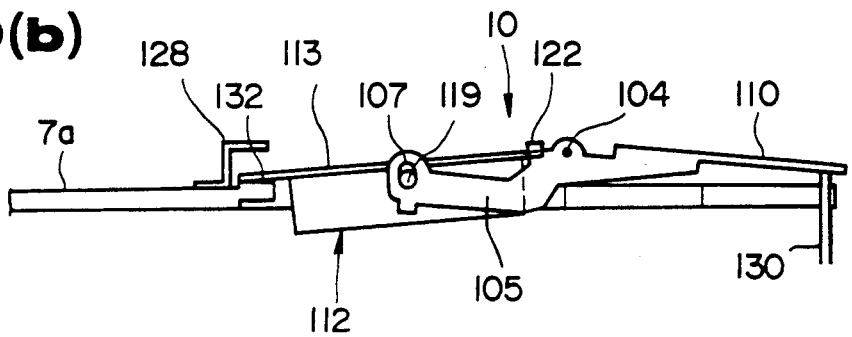
Figure 9C:
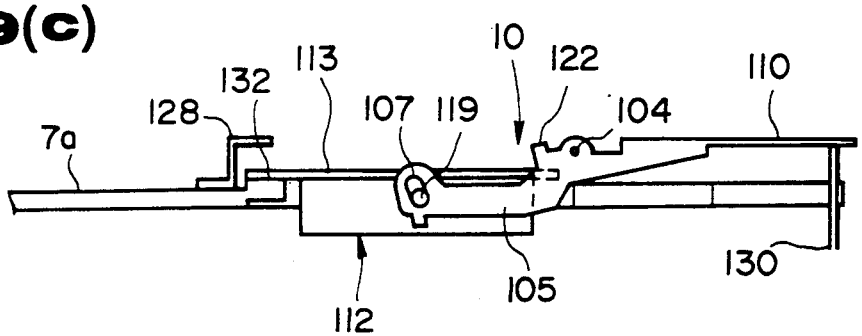

When the above mentioned cartridge holder 7 falls vertically, as shown in FIG. 9(b), the driving plate 130 will contact the lower surface of the end part of the lever part 110 and, with the fall of the cartridge holder 7, the lever part 110 will be pushed up. When the above mentioned lever part 110 is pushed up, the arm 105 will rotate with the shaft 104 as a center and the magnetic field applying member 112 will approach the disc 4. As shown in FIG. 9(b), first, the tip of the fitting plate 113 of the magnetic field applying member 112 will contact the reference plane 132 formed on the upper surface of the upper plate 7a of the cartridge holder 7. When the cartridge holder 7 further falls from this state, the arm 105 will further rotate and, as shown in FIG. 9(c), against the energizing force of the spring 121, the magnetic field applying member 112 will rotate with respect to the arm 105 and, before the end of the loading, the magnetic field applying member 112 will fall the most. That is to say, the respective flange parts 131 of the above mentioned fitting plate 113 will contact the above mentioned reference plane 132 and the magnetic field applying member 112 will be opposed parallelly to the disc 4 at a predetermined spacing.

Figure 9D:
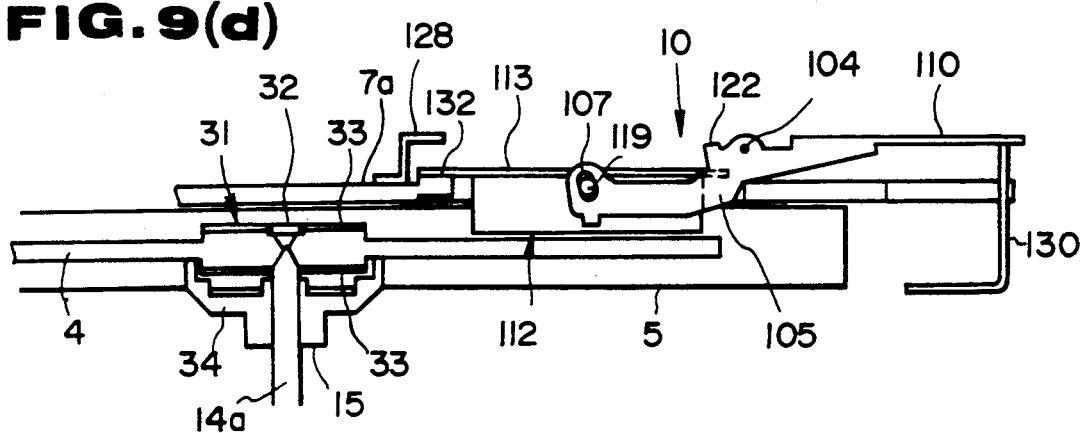

Until the end of the loading, the cartridge holder 7 will fall somewhat further. In this process, the arm 105 will further rotate but the magnetic field applying member 112 can not fall. Therefore, as shown in FIG. 9(d), the arm 105 will move with respect to the magnetic field applying member 112 along the slot 107 against the energizing force of the spring 121. When the loading thus ends, the fitting plate 113 of the above mentioned magnetic field applying member 112 will be pressed against the upper plate 7a of the cartridge holder 7. Therefore, the position of the magnetic field applying member 112 will be positively maintained. This magnetic field applying member 112 is arranged in the position opposed to the optical pickup 20 by holding the above mentioned disc 4.

At the time of unloading, an operation reverse to the above described operation will be made.

At the time of recording and erasing information, an electric current will be fed to the coil 115 of the above mentioned magnetic field applying member 112 and a bias magnetic field will be generated. At the time of recording information, for example, a bias magnetic field in the direction reverse to the magnetizing direction of the recording layer of the disc 4 will be generated and, in this state, by the optical pickup 20, a light beam will be radiated to a part of the recording layer of the above mentioned disc 4. When the part thus radiated with the light beam is heated to be above the Curie point, is demagnetized and has the radiation with the light beam stopped, the magnetization will appear again but the magnetization at this time will be parallel with the direction of the above mentioned bias magnetic direction. Thus, depending on the presence or absence of the radiation of the light beam, the magnetizing direction will be inverted and, by the difference of this magnetizing direction, digital information can be recorded. On the other hand, at the time of erasing, the bias magnetic field will be applied the same as at the time of recording, the light beam will be radiated to the place to be erased and the magnetization of the recording layer of the disc 4 will be arranged in the magnetizing direction parallel with the direction of the above mentioned bias magnetic field.

Thus, in the magnetic field applying apparatus 10 provided with this embodiment, when the magnetic field applying member 112 has risen up the most, the above mentioned magnetic field applying member 112 will be kept substantially parallel with the disc 4 and the position of the bottom surface will be substantially on the same level as of or somewhat above the lower surface of the upper plate 7a of the cartridge holder 7. Therefore, as the upward projection of the magnetic field applying member 112 is small and the moving range is small, the information recording and reproducing apparatus 1 can be made small.

When the loading ends, the cartridge holder 7 will be positioned with respect to the base 3 to be fitted with the disc 4, the magnetic field applying member 112 will be positioned with respect to this cartridge holder 7 and therefore the magnetic field applying member 112 will be accurately positioned with respect to the disc 4. Also, as the magnetic field applying member 112 is pressed against the cartridge holder 7 by the spring 121, the position of the magnetic field applying member 112 with respect to the disc 4 will be positively maintained.

The present invention is not limited to the above mentioned embodiment. For example, the arm connected with the magnetic field applying member may be fitted on the base 3 side instead of being fitted to the cartridge holder 7.

Also, the present invention is not limited to the apparatus provided with the auto-loading mechanism but can be applied to a manually loaded apparatus.

The magnetic field applying member is not limited to using a coil but may use a permanent magnet.

The present invention can be applied to an apparatus doing at least one of recording and erasing information in a photomagnetic recording medium and further to an apparatus which can reproduce information.

As explained above, according to the present invention, as the magnetic field applying member will be kept substantially parallel with the photomagnetic recording medium when maximally separated from the photomagnetic recording medium, there are effects that the moving range of the magnetic field applying member can be made small and the photomagnetic recording apparatus ca be made small.

It is apparent that, in this invention, a wide range of different working modes can be formed based on this invention without deviating from the spirit and scope of the invention. This invention is not restricted by its specific working modes except being limited by the appended claims.

What is claimed is:

1. A bias magnetic field moving apparatus for a photomagnetic recording apparatus comprising:
a holding part for holding a photomagnetic recording medium;
an arm rotatably provided on said holding part so that one end side thereof approaches and separates from said photomagnetic recording medium fitted into said photographic recording apparatus;
an arm rotating mechanism rotating said arm so that said one end side of said arm approaches and separates from said photomagnetic recording medium during loading and unloading of said photomagnetic recording medium into said photomagnetic recording apparatus;
a magnetic field applying member applying a recording and erasing bias magnetic field to said photomagnetic recording medium, said magnetic field applying member rotatably connected to said one end side of said arm, said magnetic field applying member moving between a first position and a second position during loading and unloading of said photomagnetic recording medium into said photomagnetic recording apparatus, said magnetic field applying member being separated from said photomagnetic recording medium in said first position and being further separated from said photomagnetic recording medium in said second position;

a maintaining means for maintaining said magnetic field applying member to be parallel with said photomagnetic recording medium when said magnetic field applying member is located at said second position; and a fixing means for fixing said magnetic field applying member to be in a predetermined position with said photomagnetic recording medium to apply said recording and erasing bias magnetic field when said magnetic field applying member is in said first position.

2. A bias magnetic field moving apparatus according to claim 1 wherein:

said maintaining means has an energizing means energizing said magnetic field applying member in a rotating direction with respect to said arm and a regulating means regulating the rotation of said magnetic field applying member with respect to said arm, wherein the rotation of said magnetic field applying member with respect to said arm will be regulated by said regulating means when said magnetic field applying member is in said second position and, when in said second position, said magnetic field applying member will be kept substantially parallel with said photomagnetic recording medium.

3. A bias magnetic field moving apparatus according to claim 1 wherein said fixing means will fix said magnetic field applying member to be parallel with said at a predetermined spacing when said magnetic field applying member is in said first position.

4. A bias magnetic field moving apparatus according to claim 1 wherein said holding part is positioned with respect to said photomagnetic recording medium at the time of loading.

5. A bias magnetic field moving apparatus according to claim 4 wherein said fixing means positions said magnetic field applying member with respect to said holding part.

6. A bias magnetic field moving apparatus according to claim 5 wherein said fixing means has a positioning part provided in said holding part so that said magnetic field applying member will contact said positioning part when said magnetic field applying member is in said first position and a pressing means pressing said magnetic field applying member against said positioning part when said magnetic field applying member is in said first position.

7. A bias magnetic field moving apparatus according to claim 6 wherein:

said magnetic field applying member is connected to said one end side of said arm movably in a predetermined range in a direction of said first and second positions; and said pressing means has an energizing means energizing said magnetic field applying means in the direction of said first position;

wherein, when said magnetic field applying member is in said first position, said magnetic field applying member will contact said positioning part and will move said arm against an energizing force by said energizing means and, when said magnetic field applying member is in contact with said positioning part, said magnetic field applying member will be pressed against said positioning part by the energizing force of said energizing means.

8. A bias magnetic field moving apparatus according to claim 1 wherein said arm rotating mechanism has an energizing means energizing said arm in a direction in which one end side of said arm separates from said photomagnetic recording medium, a regulating means regulating movement of said arm by said energizing means and a rotating means rotating said arm in a direction in which one end side of said arm approaches said photomagnetic recording medium against the energizing force of said energizing means during loading said photomagnetic recording medium into said photomagnetic recording apparatus.

9. A bias magnetic field moving apparatus according to claim 1 wherein said magnetic field applying member has a coil generating a bias magnetic field by electric current.

* * * * *